UNITED STATES PATENT OFFICE.

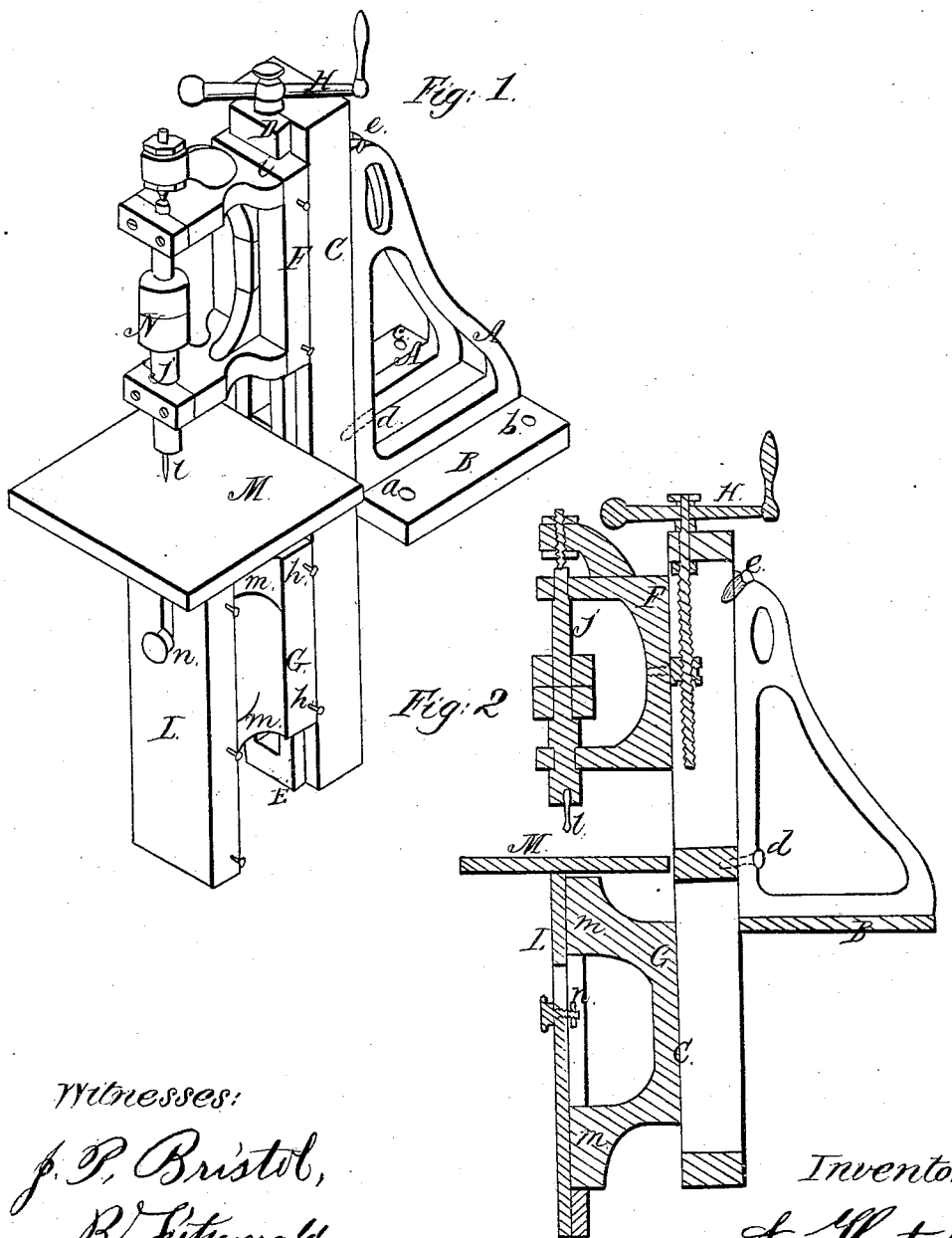

ANSON HATCH, OF NEW HAVEN, ASSIGNOR TO HIMSELF AND WILFRED H. NETTLETON, OF BRISTOL, CONNECTICUT.

DRILLING-MACHINE.

Specification forming part of Letters Patent No. 51,113, dated November 21, 1865.

*To all whom it may concern:*

Be it known that I, ANSON HATCH, of the city and county of New Haven, in the State of Connecticut, have invented a new and useful Improvement in Upright Drills; and I do hereby declare that the following is a full, clear, and exact description of the construction, character, and operation of the same, reference being had to the accompanying drawings, which make part of this specification, in which—

Figure 1 is a perspective view of the whole apparatus, showing its form and proportions. Fig. 2 is a section of the same, cut vertically through the center from front to rear, showing the relative positions of the several parts.

My improvements consist in making the upper puppet-head adjustable by the means of an adjusting-screw, so that it may be elevated or depressed at pleasure with perfect accuracy, (without hammering, &c., as is usual,) and in so constructing and arranging the whole apparatus that it may be readily attached by screws to the edge of any bench without the use or reference to any posts, studs, or braces, and so as to be well united for any kind of upright or vertical drilling.

I make the rear portion of the frame of cast-iron or any other suitable material, of the harp shape, or any other convenient form, as shown at A A, Fig. 1, and in section in Fig. 2, resting on a bed-plate, B, in which bed-plate I cast or drill holes, as shown at *a*, *b*, and *c*, through which screws may be inserted to secure it to the bench, and holes in the harp part, as at *d* and *e*, through which it may be attached to the main or central upright, C, Figs. 1 and 2.

I make the main or central part or upright, C, of cast-iron or any other suitable material, substantially of the form shown in Fig. 1 and indicated in section in Fig. 2. On the front side of this upright C, from end to end, I have a dovetail projection, as shown at D E, Fig. 1, and indicated at D E, Fig. 2, on which the upper puppet-head, F, Figs. 1 and 2, slides, and is by the screw *f*, Fig. 2, worked by the crank or handle H in the nut *g* when necessary, and on which dovetail the lower puppet-head, G, is adjusted and secured by binding-screws, as shown at *h* and *h*, Fig. 1, and in the central part of the upper portion I have a space or slot, in which the screw *f*, &c., Fig. 2, works.

I make the upper puppet-head, F, Fig. 1, of cast-iron or any other suitable material, with a dovetail groove or space on its rear surface, as indicated at *i*, Fig. 1, to slide or work on the dovetail D, to allow it to be freely elevated and depressed by the screw *f*, Fig. 2, and in the front portion I fit the drill *j*, Figs. 1 and 2, with fast and loose pulleys in the usual way, all as shown in Figs. 1 and 2.

I make the lower puppet-head, G, in the usual form, to be adjusted to the desired position and secured on the dovetail E, and on its front portions I also make dovetails, on which the front plate, L, fits and slides to elevate and depress the bed-plate M, on which the article to be drilled is to rest, to force the article up against the point of the drill *l*, in the usual way, as indicated at *m* and *m*, Fig. 2.

I make the front plate, L, of cast-iron or any other suitable material, of a suitable width and thickness for strength and convenience, and on the back or rear side I have a dovetail groove to work on the dovetail projections at *m* and *m*, Fig. 2. To the upper end of this plate L, I attach horizontally the bed-plate M, on which I place or confine the article to be drilled, and in the central part of this plate L, I fit an adjustable knob, as shown at *n*, Fig. 2, to serve as a gage for the height to which the bed-plate M can be moved, and I elevate and depress this plate L by jointed levers worked by the foot in the usual way.

Having made the several parts and attached them together as before described, the whole will appear as shown in Fig. 1 and indicated in Fig. 2.

To use my improved drill I attach the bed-plate B to the edge of any bench and apply any suitable belt to the pulley N, when the apparatus will be ready to be adjusted for any particular job of work. I adjust and secure the lower puppet-head, G, to the upright C at about the required place; and with the article to be drilled, or any other proper guide, I elevate or depress the upper puppet-head, F, to the exact point required by means of the adjusting-screw $f$, Fig. 2, and the crank H, and should the drill wear or break at any time, the upper puppet-head, F, may be readjusted at once with the greatest accuracy by but a few turns of the crank H.

The advantages of my improvement consist in that by constructing the apparatus in the manner described it may be readily attached to any bench without the use of posts, studs, or braces, which render the fitting up of other upright drills quite laborious and expensive, and in that by my arrangement of the upper puppet-head, F, I can adjust the machine with the utmost accuracy by simply turning the crank H, and therefore in much less time and without any hammering to mar the work.

What I claim as my invention, and desire to secure by Letters Patent, is—

1. The upper puppet-head, F, and its appendages, in combination with the lower puppet-head, G, and its appendages, when they are constructed, arranged, and made to operate substantially as herein described.

2. The upper puppet-head, F, in combination with the rear part, A. B, and upright C, when the whole is constructed, combined, and fitted to be attached to the bench substantially as herein described.

A. HATCH.

Witnesses:
  J. P. BRISTOL,
  R. FITZGERALD.